(12) United States Patent
Jo

(10) Patent No.: US 9,180,833 B2
(45) Date of Patent: Nov. 10, 2015

(54) AIRBAG FOR VEHICLE

(71) Applicant: HYUNDAI MOBIS Co., Ltd., Yongin-si, Gyeonggi-do (KR)

(72) Inventor: Kum Ho Jo, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/265,514

(22) Filed: Apr. 30, 2014

(65) Prior Publication Data

US 2014/0333051 A1    Nov. 13, 2014

(30) Foreign Application Priority Data

May 7, 2013    (KR) .......................... 10-2013-0051392

(51) Int. Cl.
  *B60R 21/231*    (2011.01)
  *B60R 21/217*    (2011.01)
(52) U.S. Cl.
  CPC ........... *B60R 21/231* (2013.01); *B60R 21/2171* (2013.01)
(58) Field of Classification Search
  CPC B60R 21/16; B60R 21/2171; B60R 21/2176; B60R 2021/2612; B60R 21/26; B60R 21/231; B60R 21/261

USPC ...................... 280/728.2, 732, 736, 740, 741
See application file for complete search history.

(56) References Cited

U.S. PATENT DOCUMENTS

| | | | | |
|---|---|---|---|---|
| 5,833,266 A * | 11/1998 | Bartoldus et al. | .......... | 280/743.1 |
| 7,226,077 B2 * | 6/2007 | Abe | .............. | 280/736 |
| 7,685,400 B2 * | 3/2010 | Ripberger | ..................... | 711/203 |
| 8,297,650 B2 * | 10/2012 | Enders | ........................ | 280/730.1 |
| 8,764,050 B2 * | 7/2014 | Baumgartner et al. | .... | 280/728.2 |
| 8,777,262 B2 * | 7/2014 | Enders | ........................ | 280/743.2 |
| 2004/0108699 A1 * | 6/2004 | Ford et al. | .................. | 280/743.1 |
| 2005/0110244 A1 * | 5/2005 | Wheelwright et al. | .... | 280/728.2 |
| 2006/0097490 A1 * | 5/2006 | Seidl et al. | ................ | 280/728.2 |
| 2008/0106074 A1 * | 5/2008 | Ford | .......................... | 280/728.2 |
| 2009/0189375 A1 * | 7/2009 | Lunt et al. | .................... | 280/741 |
| 2011/0316263 A1 * | 12/2011 | Lunt et al. | ................. | 280/730.2 |
| 2012/0049497 A1 * | 3/2012 | Enders | ........................ | 280/743.1 |

* cited by examiner

*Primary Examiner* — James English
(74) *Attorney, Agent, or Firm* — Paratus Law Group, PLLC

(57) ABSTRACT

An airbag for a vehicle of the present invention includes: an inflator; and an airbag cushion, in which first and second slits are formed in the airbag cushion so as to be spaced apart at a predetermined distance, and one end of the inflator is inserted into the airbag cushion through the first slit, and then protrudes to the outside of the airbag cushion through the second slit, and as a result, the inflator is securely and conveniently coupled to the airbag cushion.

8 Claims, 5 Drawing Sheets

AIRBAG FOR VEHICLE

CROSS REFERENCE TO PRIOR APPLICATIONS

The present application claims priority under 35 U.S.C. §119 to Korean Patent Application No. 10-2013-0051392 (filed on May 7, 2013), which is hereby incorporated by reference in its entirety.

TECHNICAL FIELD

The present invention relates to an airbag for a vehicle, and more particularly, to an invention in which an inflator is inserted and installed in a side airbag for a vehicle.

BACKGROUND

In general, airbags are used by being installed in a vehicle in order to protect heads and chests of a driver and a passenger from a collision accident while being instantaneously inflated by gas at the time of a vehicle collision accident.

Among the airbags, some airbags are installed in a steering wheel or a front panel so as to protect the passenger at the time of a head-on collision of the vehicle. In addition, a side airbag is installed so as to protect the passenger from an impact that occurs at a side of the vehicle.

According to the side airbag that is used for the aforementioned purpose, an inflator is installed at one side of the side airbag so that an airbag cushion can be inflated and deployed at the time of a collision accident. The inflator instantaneously generates high-pressure gas at the time of a vehicle collision, and injects the high-pressure gas into the airbag cushion.

According to the side airbag in the related art, the inflator is coupled in the airbag cushion by forming left and right side sheets elongated at the rear of the airbag cushion, installing the inflator between the left and right side sheets, and then surrounding the inflator with the left and right side sheets.

Stud insertion holes are formed in the left and right side sheets, respectively, and a stud, which is formed on the inflator, is inserted into and passes through the stud insertion holes that are formed in the left and right side sheets.

However, according to the aforementioned side airbag, the numbers of components and manufacturing processes for installing the inflator are large, and thus workability deteriorates, manufacturing costs are increased, and there are many difficulties in manufacturing the side airbag due to the deterioration in workability.

SUMMARY

The present invention has been made in an effort to provide an airbag for a vehicle which allows an inflator to be conveniently installed in the airbag cushion for a vehicle, thereby reducing costs and improving convenience for work.

Technical problems of the present invention are not limited to the aforementioned technical problems, and other technical problems, which are not mentioned above, may be clearly understood by those skilled in the art from the following descriptions.

An exemplary embodiment of the present invention provides an airbag for a vehicle including: an inflator; and an airbag cushion that is deployed by the inflator at the time of a vehicle collision.

First and second slits may be formed in the airbag cushion so as to be spaced apart at a predetermined distance, and one end of the inflator may be inserted into the airbag cushion through the first slit, and then may protrude to the outside of the airbag cushion through the second slit.

A squib may be formed at the one end of the inflator.

The inflator may have at least one stud, and a hole through which the stud protrudes to the outside may be formed in the airbag cushion between the first and second slits.

A plurality of studs may be formed so as to be spaced apart from each other in a length direction of the inflator, and a plurality of holes through which the plurality of studs protrudes to the outside may be formed in the airbag cushion so as to be spaced apart from each other.

A gas discharge port may be formed in the inflator between the plurality of studs.

A separation distance between the plurality of holes may be shorter than a separation distance between the plurality of studs.

A length of the second slit may be one-half of an outer circumference of the one end of the inflator or smaller than a diameter of the one end of the inflator.

A reinforcing fabric, which covers a portion where the inflator is installed, may be attached to the airbag cushion, a squib hole through which the squib of the inflator protrudes may be formed in the reinforcing fabric, and a plurality of stud holes through which the plurality of studs protrudes may be formed in the reinforcing fabric.

A stud hole among the plurality of stud holes, which is at least adjacent to the squib hole, may be formed in a rectangular shape that has a longer length in an upward and downward direction, and a diameter of a stud hole, which is spaced farthest apart from the squib hole, may be smaller than a diameter of the stud.

A separation distance between the plurality of stud holes may be shorter than a separation distance between the studs.

According to the airbag for a vehicle according to the present invention, there are one or more effects as follows.

The number of components for installing the inflator in the airbag cushion for a vehicle is reduced, working time is reduced, and a size of the airbag cushion is minimized such that a weight of the airbag cushion is reduced, and costs are reduced.

The effects of the present invention are not limited to the aforementioned effects, and other effects, which are not mentioned above, will be clearly understood by those skilled in the art from the claims.

DETAILED DESCRIPTION

Figure 1:
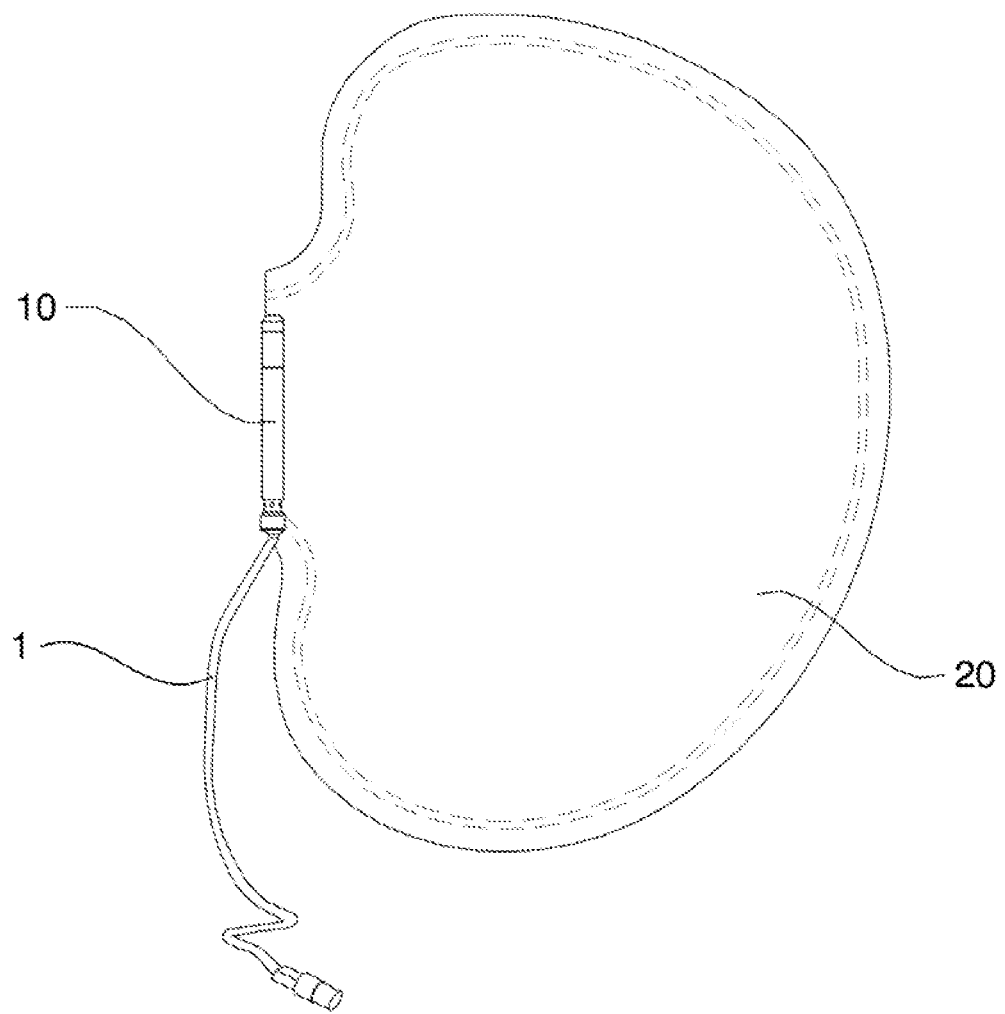
FIG. 1 is a side view illustrating an airbag for a vehicle according to an exemplary embodiment of the present invention.

Advantages and features of the present invention and methods of achieving the advantages and features will be clear with reference to an exemplary embodiment described in detail below together with the accompanying drawings. However, the present invention is not limited to the exemplary embodiment set forth below, and may be embodied in various other forms. The present exemplary embodiment is for rendering the disclosure of the present invention complete and is set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for explaining an airbag for a vehicle according to an exemplary embodiment of the present invention.

Figure 2:
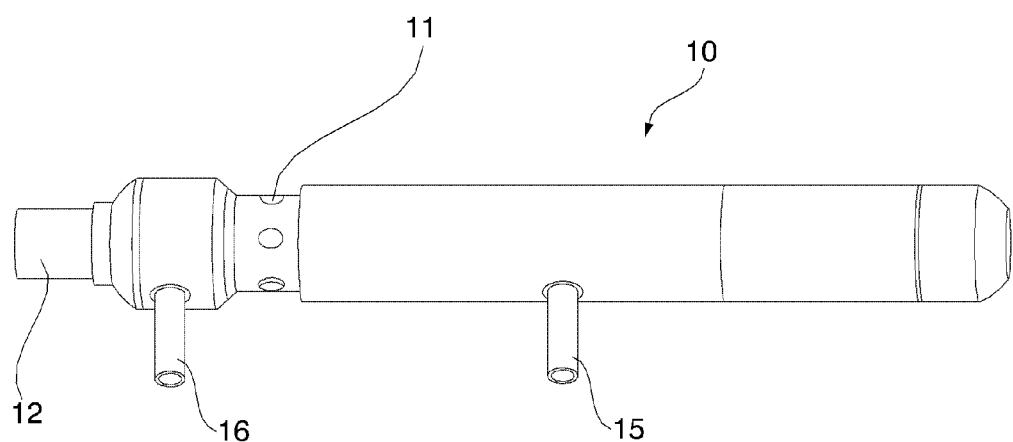
FIG. 2 is a perspective view of an inflator used in the exemplary embodiment of the present invention.
Figure 3:
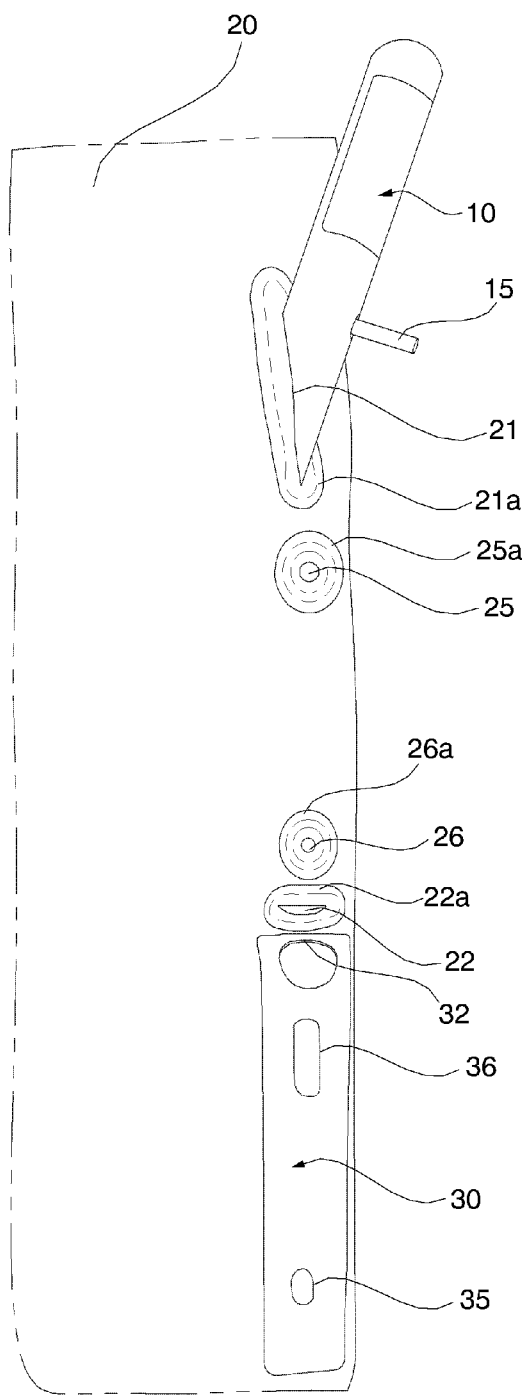
FIG. 3 is a perspective view illustrating a state in which a part of the inflator is inserted into an airbag cushion of the airbag for a vehicle according to the exemplary embodiment of the present invention.
Figure 4:
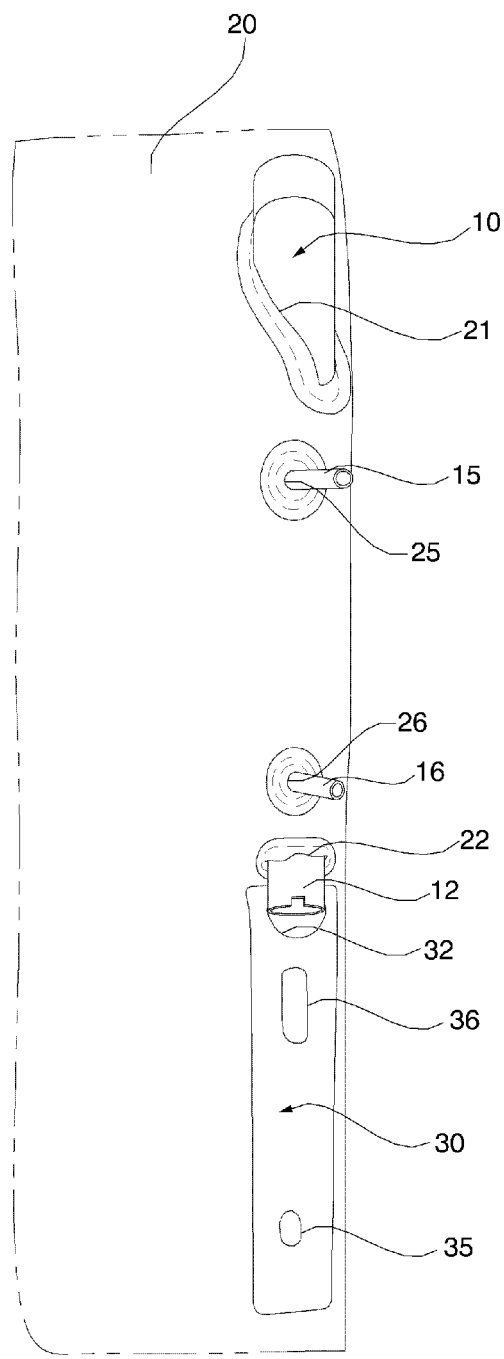
FIG. 4 is a perspective view illustrating a state in which an inflator is installed in an airbag cushion of a side airbag for a vehicle according to the exemplary embodiment of the present invention.
Figure 5:
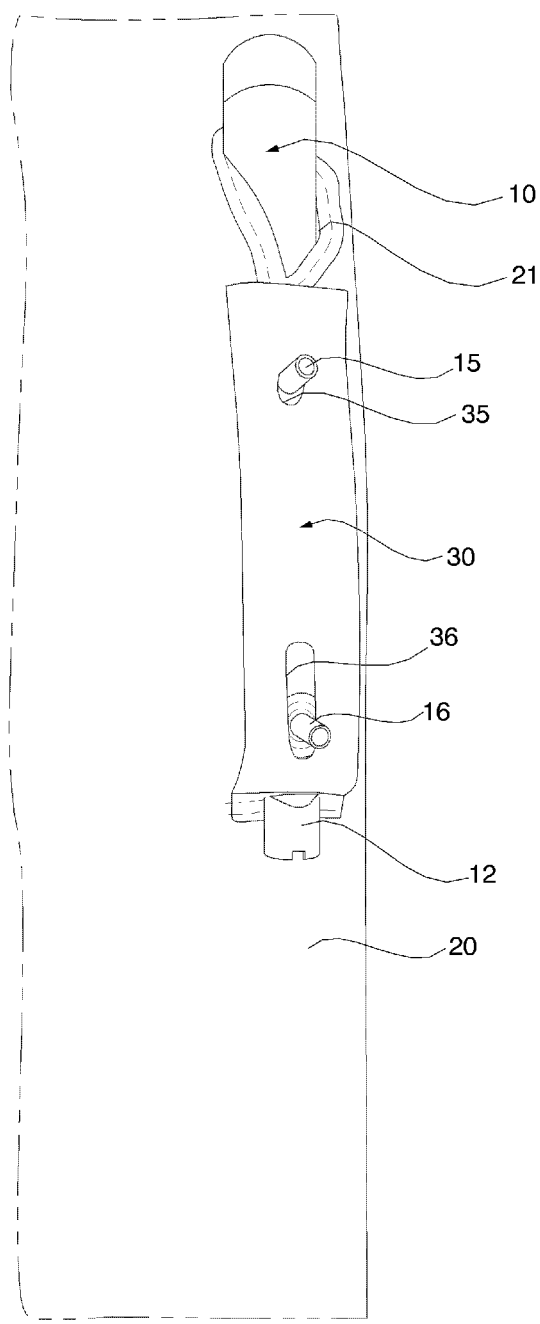
FIG. 5 is a perspective view illustrating a state in which the inflator is completely installed in the airbag cushion of the airbag for a vehicle according to the exemplary embodiment of the present invention.

FIG. 1 is a side view illustrating a side airbag for a vehicle according to an exemplary embodiment of the present invention, FIG. 2 is a perspective view of an inflator used in the exemplary embodiment of the present invention, FIG. 3 is a perspective view illustrating a state in which a part of the inflator is inserted into an airbag cushion of the airbag for a vehicle according to the exemplary embodiment of the present invention, FIG. 4 is a perspective view illustrating a state in which the inflator is installed in the airbag cushion of the airbag for a vehicle according to the exemplary embodiment of the present invention, and FIG. 5 is a perspective view illustrating a state in which the inflator is completely installed in the airbag cushion of the airbag for a vehicle according to the exemplary embodiment of the present invention.

Referring to FIGS. 1 and 2, a side airbag for a vehicle according to an exemplary embodiment of the present invention includes an inflator 10, and an airbag cushion 20 in which the inflator 10 is installed.

A squib 12 is formed at one end of the inflator 10, and a wire connector 1, which receives an electrical signal, which is generated in accordance with a vehicle collision, from a control device and transmits the electrical signal to the inflator 10, is connected to the squib 12.

Therefore, when a control signal is transmitted to the inflator 10 from the wire connector 1 at the time of a vehicle collision, the inflator 10 generates compressed gas, and the compressed gas flows into the airbag cushion 20, such that the airbag cushion 20 is deployed.

As illustrated in FIGS. 3 and 4, a first slit and a second slit 22, which is spaced apart from the first slit 21 at a predetermined distance, are formed in the airbag cushion 20.

The squib 12, which is formed at one end of the inflator 10, is inserted into the airbag cushion 20 through the first slit 21, and then protrudes to the outside through the second slit 22.

Because the airbag cushion is made of an elastic material, a length of the first slit 21 is one-half of an outer circumference of the inflator 10 or smaller than a diameter of the inflator 10 so that the inflator 10 including the squib 12 may be forcedly fitted into the first slit 21.

In addition, a length of the second slit 22 is also one-half of an outer circumference of the squib 12 or smaller than a diameter of the squib 12 so that the squib 12 may be tightly fitted into the second slit 22.

A plurality of studs 15 and 16, which is spaced apart from each other in a length direction of the inflator 10, is formed on the inflator 10.

Although one stud may be formed, a configuration in which two studs 15 and 16 are formed will be described in the present invention.

Meanwhile, reinforcing members 21a and 22a may be attached to the airbag cushion 20 around the first and second slits 21 and 22 by sewing, and thereafter, the first and second slits may be formed in the reinforcing members.

Referring to FIGS. 3 and 4, holes 25 and 26 are formed between the first and second slits 21 and 22 of the airbag cushion 20 so that the studs 15 and 16 may protrude to the outside through the holes 25 and 26.

Diameters of the holes 25 and 26 may be smaller than diameters of the studs 15 and 16 so that the studs 15 and 16 may be tightly fitted into the holes 25 and 26 when the studs 15 and 16 pass through the holes 25 and 26.

A separation distance between the holes 25 and 26 may be shorter than a separation distance between the studs 15 and 16 so that the inflator 10 may be fixed to the airbag cushion 20 by merely fitting the studs 15 and 16 into the holes 25 and 26.

Reinforcing members 25a and 26a may also be attached to the airbag cushion 20 around the holes 25 and 26 by sewing, and thereafter, the holes 25 and 26 may be formed.

Meanwhile, gas discharge ports 11 are formed between the studs 15 and 16 such that compressed gas may be more stably injected into the airbag cushion 20 due to the studs 15 and 16 when the inflator 10 is operated.

The gas discharge ports 11 may be formed to be adjacent to the squib 12.

In order to reinforce a structure for installing the inflator 10, a reinforcing fabric 30 is attached to the airbag cushion 20 at a lower side of the second slit 22.

Stud holes 35 and 36 and a squib hole 32 are formed in the reinforcing fabric 30 so as to correspond to the holes 25 and 26 and the second slit 22, respectively, which are formed in the airbag cushion 20.

The stud holes 35 and 36 may have different sizes.

That is, among the stud holes 35 and 36, a second (lower) stud hole 36 adjacent to the squib hole 32 may be formed in a rectangular shape that is elongated in an upward and downward direction, and a first (upper) stud hole 35, which is spaced far apart from the squib hole 32, may be formed in a rectangular shape that has a length in the upward and downward direction which is smaller than that of the second (lower) stud hole 36 or may have a diameter that is smaller than a diameter of the second stud hole 36. Therefore, the lower stud 16 may be easily fitted into the second stud hole 36, and thereafter, the upper stud 15 may be tightly fitted into the first stud hole 35.

An operation of the airbag for a vehicle according to the present invention, which is configured as described above, will be described below.

The squib 12 of the inflator 10 is inserted into the first slit 12 formed in the airbag cushion 20, and thereafter, the studs 15 and 16 protrude to the outside of the airbag cushion through the holes 25 and 26, and the squib 12 protrudes to the outside of the airbag cushion 20 through the second slit 22.

The reinforcing fabric 30 is pulled upward such that the squib 12, which protrudes to the outside of the airbag cushion, is fitted into the squib hole 32, the lower stud 16 is fitted into the lower stud hole 36, and the upper stud 15 is fitted into the upper stud hole 36, and as a result, the inflator 10 is completely installed in the airbag cushion 20.

Next, the wire connector 1 is connected with the squib 12.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An airbag for a vehicle, comprising:
an inflator; and
an airbag cushion in which the inflator is installed,
wherein first and second slits formed in the airbag cushion so as to be spaced apart at a predetermined distance,
end of the inflator is inserted into the airbag cushion through the first slit, and then protrudes to the outside of the airbag cushion through the second slit,
wherein a plurality of studs is formed on the inflator so as to be spaced apart from each other in a length direction of the inflator, and
a plurality of holes through which the plurality of studs protrudes to the outside is formed in the airbag cushion so as to be spaced apart from each other between the first and second slits,
wherein a separation distance between the plurality of holes is shorter than a separation distance between the plurality of studs.

2. The airbag of claim 1, wherein a length of the second slit is one-half of a circumference of the one end of the inflator or smaller than a diameter of the one end of the inflator.

3. The airbag of claim 1, wherein a reinforcing fabric, which covers a portion where the inflator is installed, is attached to the airbag cushion.

4. The airbag of claim 3, wherein the reinforcing fabric includes a squib hole, wherein a squib formed at the one end of the inflator protrudes to the outside through the second slit and the squib hole.

5. The airbag of claim 4, wherein a plurality of studs is formed in the inflator, and a plurality of stud holes through which the plurality of studs protrudes is formed in the reinforcing fabric.

6. The airbag of claim 5, wherein a stud hole among the plurality of stud holes, which is at least adjacent to the squib hole, is formed in a rectangular shape that has a longer length in an upward and downward direction.

7. The airbag of claim 5, wherein a separation distance between the plurality of stud holes is shorter than a separation distance between the studs.

8. An airbag for a vehicle, comprising:
an inflator; and
an airbag cushion in which the inflator is installed,
wherein first and second slits formed in the airbag cushion so as to be spaced apart at a predetermined distance,
end of the inflator is inserted into the airbag cushion through the first slit, and then protrudes to the outside of the airbag cushion through the second slit,
wherein a reinforcing fabric, which covers a portion where the inflator is installed, is attached to the airbag cushion,
wherein the reinforcing fabric includes a squib hole, wherein a squib formed at the one end of the inflator protrudes to the outside through the second slit and the squib hole,
wherein a plurality of studs is formed in the inflator, and a plurality of stud holes through which the plurality of studs protrudes is formed in the reinforcing fabric,
wherein a diameter of a stud hole among the plurality of stud holes, which is spaced farthest apart from the squib hole, is smaller than a diameter of the stud.

* * * * *